United States Patent

Takahashi et al.

[11] Patent Number: 6,031,974
[45] Date of Patent: *Feb. 29, 2000

[54] IMAGE PROCESSING APPARATUS AND METHOD, AND METHOD OF MANUFACTURING INK-JET RECORDED ARTICLE

[75] Inventors: Kazuyoshi Takahashi, Kashiwazaki; Makoto Katsuma, Kawaguchi; Takashi Watanabe, Yokohama; Hiroshi Endo, Sagamihara; Toshiyuki Yanaka, Tokyo; Toshiaki Mabuchi, Tama; Eiichi Takagi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/407,372

[22] Filed: Mar. 20, 1995

[30] Foreign Application Priority Data

Mar. 25, 1994 [JP] Japan .................................... 6-056264

[51] Int. Cl.⁷ .............................. B41B 15/00; B41J 15/00; G06F 15/00; H04N 1/46
[52] U.S. Cl. .......................... 395/109; 358/501; 358/502; 358/518; 358/534; 358/535
[58] Field of Search ..................................... 358/502, 518, 358/431, 503, 523, 501, 455, 456, 457, 458, 534, 535; 395/109

[56] References Cited

U.S. PATENT DOCUMENTS 5,270,808  12/1993  Tanioka .................................... 358/527
5,363,219  11/1994  Yoshida .................................... 358/443
5,488,407  1/1996   Tachibana ............................... 347/264
5,521,989  5/1996   Fan .......................................... 382/270
5,535,019  7/1996   Eschbach ............................... 358/456

FOREIGN PATENT DOCUMENTS 0317140    5/1989  European Pat. Off. .
0369778    5/1990  European Pat. Off. .
0501023    9/1992  European Pat. Off. .
0550872    7/1993  European Pat. Off. .
62-053492  3/1987  Japan .
63-123271  5/1988  Japan .
3046589    7/1991  Japan .
WO91 06174 5/1991  WIPO .

OTHER PUBLICATIONS

H. Kotera, et al., "A Poster–Size Color Ink–Jet Printing System", Proceedings of the Society for Information Display (SID), vol. 25, No. 4, pp. 321–329, 1984.

T. Watanabe, "Improved Dithering Methods for Color Quantized Images", Systems and Computers in Japan, vol. 21, No. 10, pp. 68–77, 1990.

Primary Examiner—Kimberly A. Williams
Attorney, Agent, or Firm—Fitzpatrick, Cella, Harper & Scinto

[57] ABSTRACT

The invention seeks to reduce amount of image data without detracting from picture quality, thereby lowering processing speed and holding down memory cost. While preserving the density of color image data, a computer compresses the color image data, which has been outputted by an image scanner, to a prescribed number of colors on the basis of the colors of inks. An image processor binarizes the results of compression, while preserving density, on the basis of ink colors. A main unit repeatedly prints a basic image, which is represented by the binarized image data, on cloth supplied from a supply unit.

21 Claims, 15 Drawing Sheets

|  |  | D | 2/8 | 1/8 |
|---|---|---|---|---|
|  | 1/8 | 2/8 | 1/8 |  |
|  |  | 1/8 |  |  |

|  |  | D | 8 | 4 |
|---|---|---|---|---|
|  | 4 | 8 | 4 |  |
|  |  | 4 |  |  |

| EXAMPLE OF PALETTE DATA | C | M | Y | K |
|---|---|---|---|---|
| 0 | 0 | 0 | 0 | 0 |
| 75 | 200 | 100 | 0 | 0 |
| 139 | 100 | 100 | 100 | 255 |
| 58 | 0 | 150 | 80 | 0 |

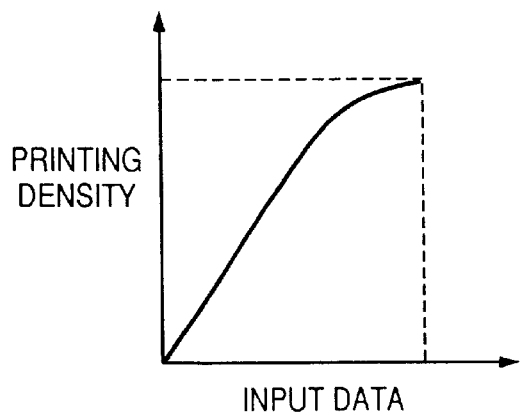
FIG. 10A
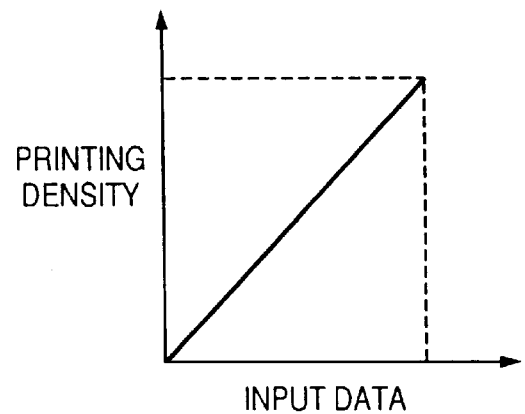
FIG. 10B
FIG. 11
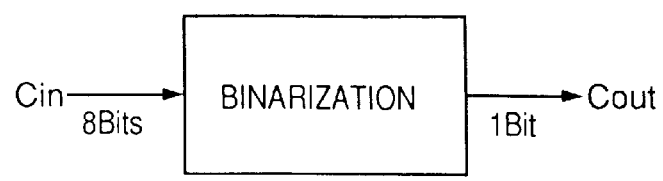

|   |   |   | D | 7/48 | 5/48 |
|---|---|---|---|------|------|
| 3/48 | 5/48 | 7/48 | 5/48 | 3/48 |
| 1/48 | 3/48 | 5/48 | 3/48 | 1/48 |

|   |   |   | D | 17 | 12 |
|---|---|---|---|----|----|
|   | 7 | 12 | 17 | 12 | 7 |
|   | 2 | 7 | 12 | 7 | 2 |

BASIC IMAGE

DUMMY IMAGE AREA

BASIC IMAGE AREA

FIG. 16A

| 10 | 10 | 10 | 10 | 10 | 10 | 10 | 10 |
|----|----|----|----|----|----|----|----|
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |

FIG. 16B

| 0 | 1 | 0 | 0 | 0 | 0 | 0 | 0 |
|---|---|---|---|---|---|---|---|
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 1 | 0 |

FIG. 16C

| 0  | 0  | 85 | 0  | 0  | 0 | 0  | 0 |
|----|----|----|----|----|---|----|---|
| 0  | 0  | 0  | 0  | 85 | 0 | 0  | 0 |
| 0  | 0  | 0  | 0  | 0  | 0 | 0  | 0 |
| 85 | 0  | 0  | 0  | 0  | 0 | 0  | 0 |
| 0  | 85 | 0  | 0  | 0  | 0 | 0  | 0 |
| 0  | 0  | 0  | 0  | 0  | 0 | 85 | 0 |
| 0  | 0  | 0  | 85 | 0  | 0 | 0  | 0 |
| 0  | 0  | 85 | 0  | 0  | 0 | 0  | 0 |

FIG. 16D

| 0 | 0 | 0 | 0 | 0 | 0 | 0 | 0 |
|---|---|---|---|---|---|---|---|
| 0 | 0 | 1 | 1 | 0 | 0 | 0 | 0 |
| 0 | 0 | 1 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

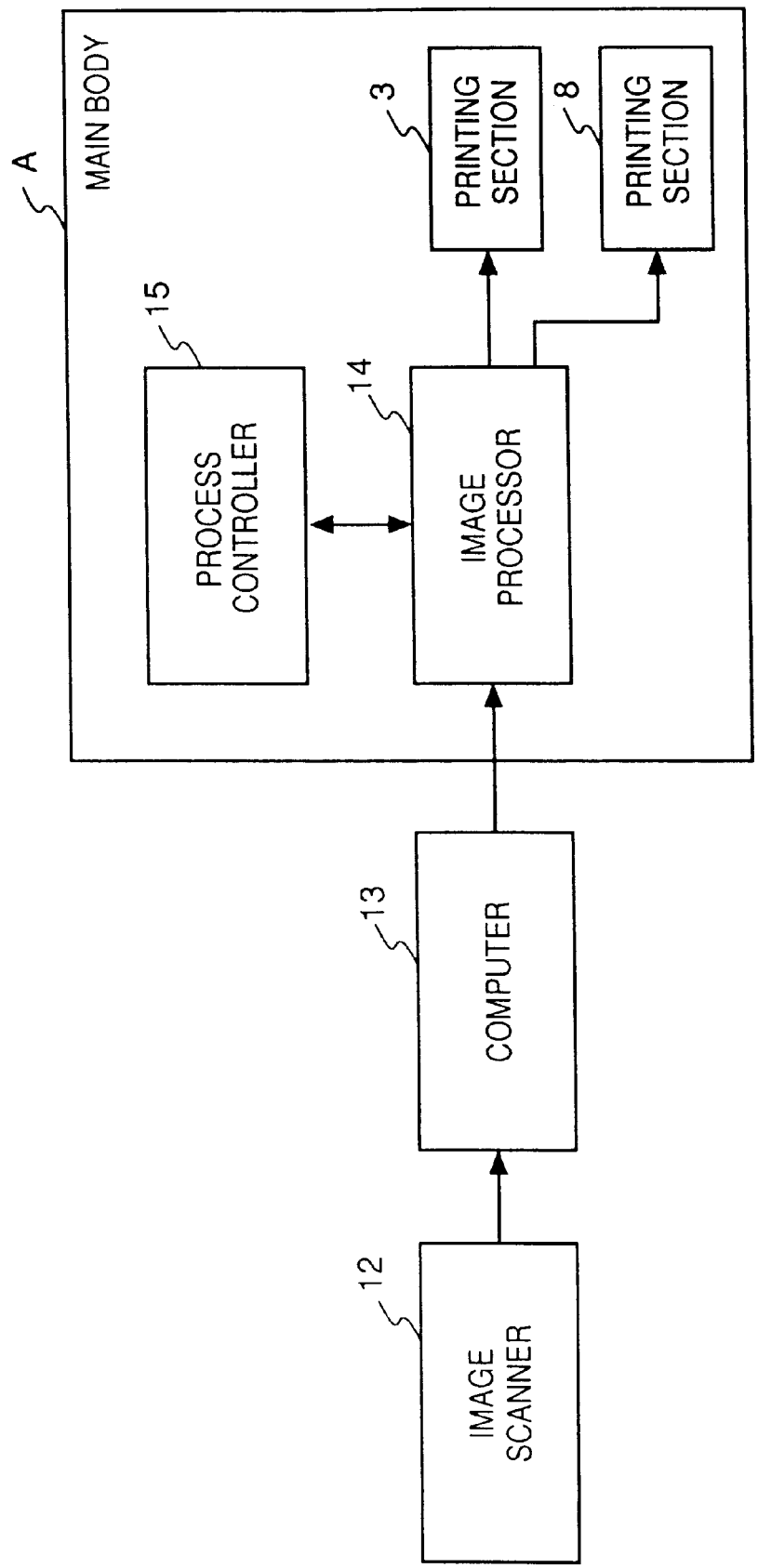

IMAGE PROCESSING APPARATUS AND METHOD, AND METHOD OF MANUFACTURING INK-JET RECORDED ARTICLE

BACKGROUND OF THE INVENTION

1. Field of the Invention

This invention relates to an image processing method and apparatus, as well as to a method of manufacturing an article recorded on by ink-jet printing. By way of example, the invention relates to an image forming apparatus for converting a full-color image to palette data of a prescribed number of colors and repeatedly printing the palette image, or to an image forming apparatus referred to as a so-called binary printer.

2. Description of the Related Art

RGB color image data composed of eight bits for each of the colors R, G, B amounts to three megabytes in case of an image of 1000×1000 pixels. In order to obtain palette data while minimizing a decline in picture quality, use is made of a technique such as the density preservation method or vector quantization method. For example, "Photoshop" software developed by Adobe Systems incorporates technology considered to be equivalent to the functions mentioned above.

Further, a method of compressing the number of colors using the error diffusion method or an improved technique in which a random-number scheme or dither matrix is applied to this method has been proposed.

A number of problems are encountered in the prior art described above.

Specifically, expressing about 1,670,000 colors using eight-bit RGB (i.e., 24-bit) full-color image data is ordinary. The problem is that although picture quality is good, the amount of data is enormous, there is a decline in processing speed and an increase in memory cost. For this reason, a so-called palettizing technique is used, in which the image data is coded to be compressed to a prescribed number of colors, e.g., 256 colors.

On the other hand, to the extent that a binary color printer such as one using the ink-jet printing technique is capable of expressing gradations in density in pixel units, it cannot control the amount of ink jetted per pixel. For this reason, tones are expressed in simulated fashion by controlling the number of dots in a unit of area using the error diffusion method or dither method. Accordingly, when a palettized image, especially a natural picture such as a photograph, or an image having more colors than the number of palette colors is printed using a binary color printer, a problem which arises is a conspicuous deterioration in picture quality.

Further, software such as the aforementioned "Photoshop" subjects image data to palettization using the error diffusion method. However, since such software cannot give sufficient consideration to the characteristics of the ink used by the printer in printing, a problem which arises is that density cannot be preserved accurately.

Furthermore, in a case where a basic image is repeatedly printed, as in the manner of textile printing used in dyeing fabric, the so-called "sweeping" phenomenon, which is a disadvantage of the error diffusion method, occurs at the boundaries or borders of the repeatedly printed basic images. The result is a fainter image at the boundaries and loss of continuity. Herein "sweeping" is a phenomenon which causes blurring of an image when image data appears as black-color data in the following conditions. That is, the black-color data appears when a value of image data at a low-density portion of the image does not exceed a threshold value for binarization after image processing such as an error diffusion method is started, and errors corresponding to a few number of pixels are stored by the error diffusion method.

Furthermore, in order to compress the number of colors to 256 colors by palettization while minimizing a decline in picture quality, use is made of a technique in which vector quantization is carried out based upon the frequency distribution of each color of the image. However, processing takes too much time and picture quality does not stabilize owing to the accuracy of rounding (approximation) to 256 colors.

SUMMARY OF THE INVENTION

An object of the present invention is to reduce the amount of image data without detracting from picture quality, thereby lowering processing speed and preventing an increase in memory cost.

According to the present invention, the foregoing object is attained by providing an image processing apparatus comprising converting means for converting given color image data to data of a prescribed number of colors while preserving density of the color image data, and binarization means for subjecting results of conversion by the converting means to density-preserving binarization processing.

Another object of the present invention is to prevent the so-called "sweeping" phenomenon, which is a disadvantage of the error diffusion method, thereby solving the problem in which the image grows fainter at the boundaries of the repeatedly printed basic images, thus resulting in loss of continuity.

Another object of the present invention is to reduce concentration of density caused by enlargement processing which follows color compression.

Still another object of the present invention is to prevent a decline in picture quality caused by moiré or other interference.

Yet another object of the present invention is to execute appropriate processing of multivalued image data in an image forming unit.

A further object of the present invention is to achieve high-speed processing of color image data.

A further object of the present invention is to obtain a color image having excellent tonality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A and 10B are diagrams for describing an example of a gamma correction performed by the image processor shown in FIG. 1;

FIG. 11 is a diagram for describing an example of binarization performed by the image processor shown in FIG. 1;

FIGS. 16A, 16B, 16C and 16D are diagrams illustrating examples of problems which arise when enlargement processing is executed after color compression;

FIG. 17 is a block diagram illustrating the construction of this embodiment.

DESCRIPTION OF THE PREFERRED EMBODIMENTS

An image processing apparatus embodying the present invention will now be described in detail with reference to the drawings.

First Embodiment

Figure 1:
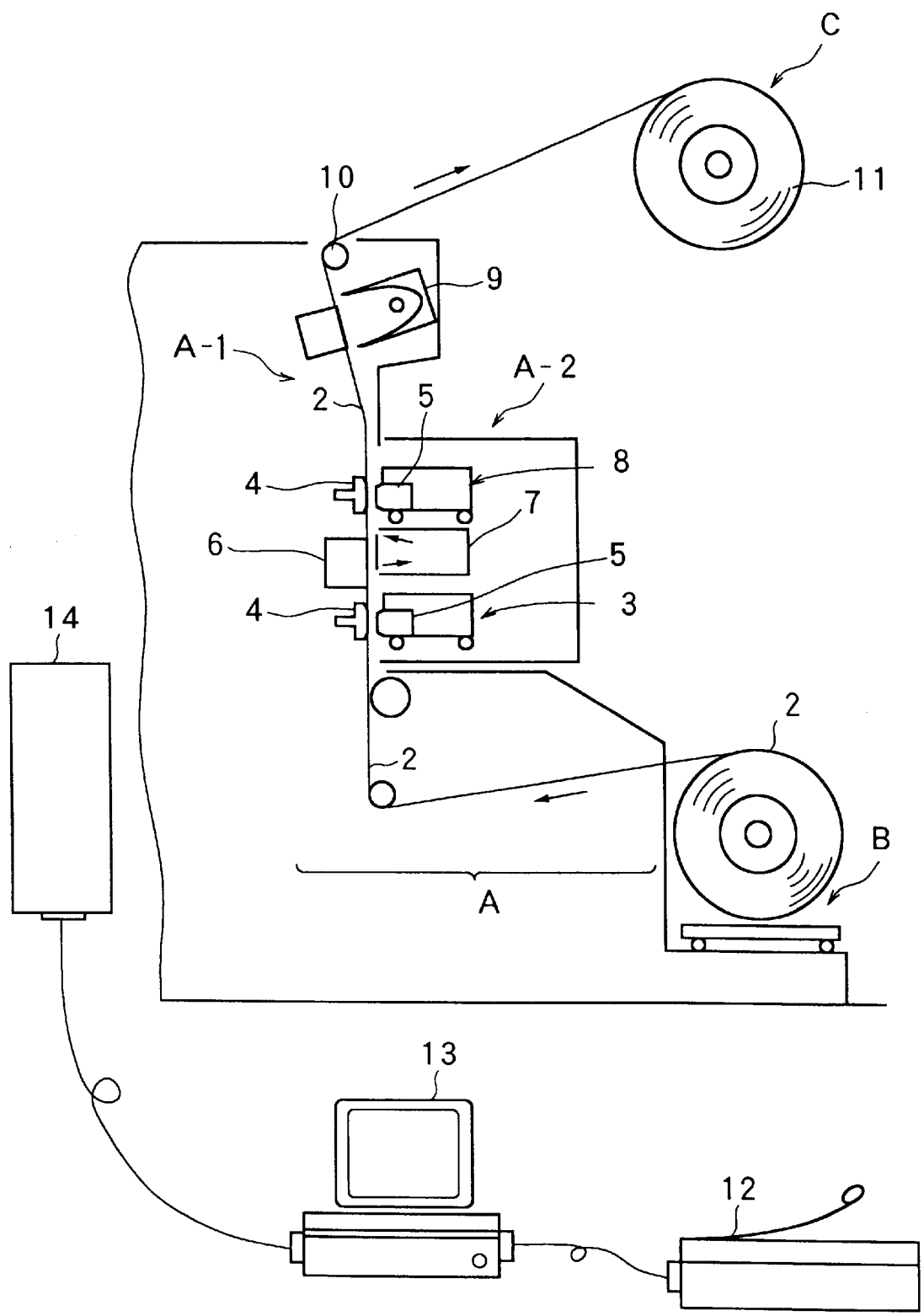
FIG. 1 is a diagram showing the general features of an image processing system embodying the present invention.

FIG. 1 illustrates the general features of an image processing system including an image processing apparatus according to a first embodiment of the present invention.

As shown in FIG. 1, the system includes a supply section B for supplying a continuous recording medium (such as a fabric, paper or film) wound into a roll; a main body A for feeding the supplied recording medium in precise increments and printing on the medium using an ink-jet head; and a take-up section C for winding up the printed recording medium into a roll. The main body A includes a precision feeder A-1 inclusive of a platen for precisely feeding the recording medium, and a printing unit A-2. It will be assumed that the recording medium is a fabric in the discussion that follows.

A rolled fabric 2 is fed incrementally from the supply section B to the main body A. The fed fabric 2 has its print surface flattened by a platen 4 in a printing section 3, and the print surface has an image printed on it by ink jetted from an ink-jet head 5. Whenever printing over a prescribed width (which may, for example, be a width corresponding to the number of nozzles possessed by the ink-jet head) is finished, the fabric 2 is fed by a corresponding amount and the ink on the surface of the fabric 2 is dried by heat from a heating plate 6 and hot air expelled from a hot-air duct 7.

Next, an image is printed on the fabric 2 by being superimposed upon the above-mentioned image at a printing section 8 through a method the same as that described above.

The fabric 2 on which printing has been completed is dried again by a drying unit 9 comprising a heating plate and a heater (or hot-air blower), the dried fabric is introduced to a guide roll 10 and eventually reaches the take-up section C, at which the fabric is wound up into the form of a roll, as indicated at number 11.

The image data for printing is obtained by reading an original using an image scanner 12 comprising a CCD line sensor, the data is subjected to various image processing by a computer 13 (which is an external computer provided separately of the main body A), and the processed image data is fed into an image processor 14. The image data processed by the image processor 14 is sent to the printing section 3 or 8, which then executes printing. It should be noted that the image processor 14 is built in the main body A. The arrangement described above is as illustrated in FIG. 17.

As shown in FIG. 17, the main body A has a process controller 15 for controlling the supply section B, the take-up section C and the image processor 14, etc. By providing a control interface, the main body A can be controlled directly by the computer 13 rather than by the controller 15. Further, it goes without saying that the apparatus may be one in which the image scanner 12, computer 13, image processor 14 and main body A are integrated into a whole.

Figure 4:
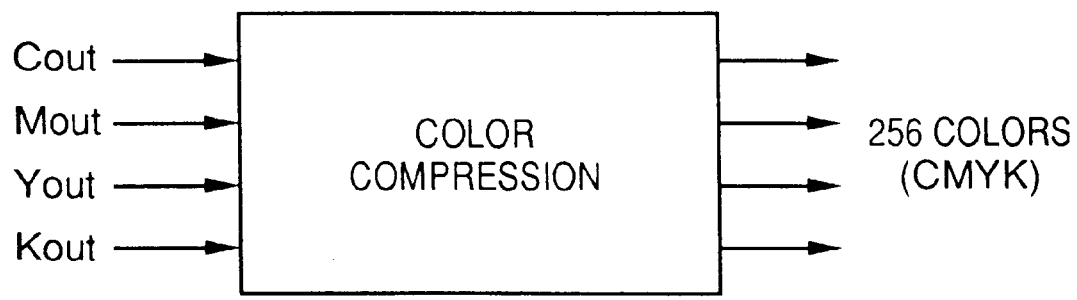
FIG. 4 is a diagram for describing an example of color compression performed by the computer shown in FIG. 1.
Figures 5A, 5B, 5C:
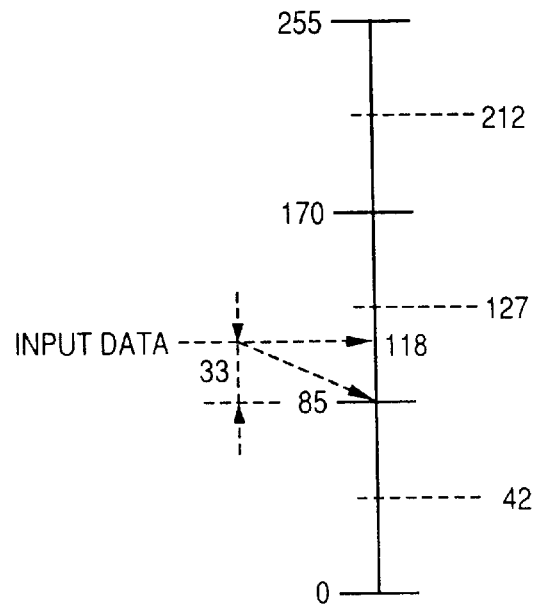
FIGS. 5A, 5B and 5C are diagrams for describing the details of color compression.
Figure 6:
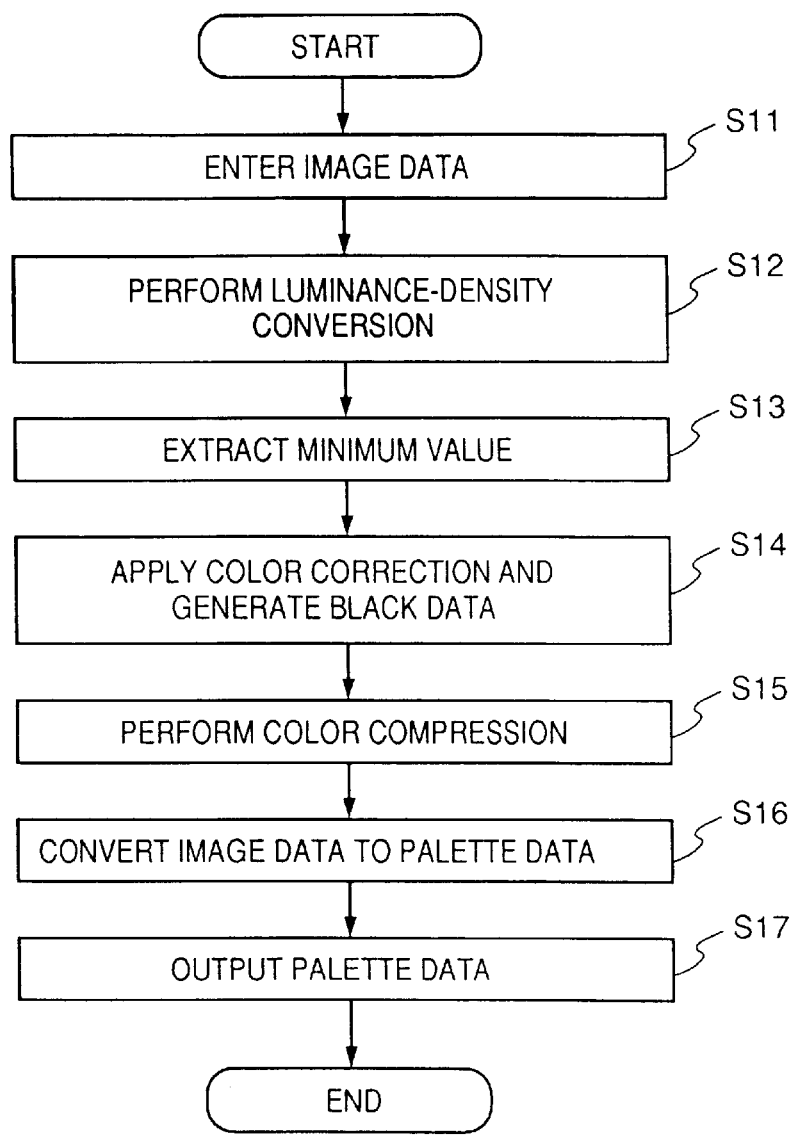
FIG. 6 is a flowchart illustrating an example of a processing procedure executed by the computer shown in FIG. 1.
Figure 7:
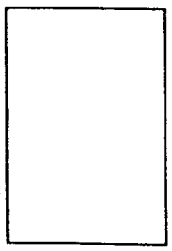
FIG. 7 is a diagram for describing an example of image data entered into an image processor shown in FIG. 1.

FIGS. 2A through 5C are diagrams for describing an example of image processing executed by the computer 13. FIG. 6 is a flowchart illustrating an example of the processing procedure of the computer 13. It should be noted that the computer 13 executes the processing shown in FIG. 6 in accordance with a program externally supplied by a magnetic recording medium or the like.

Figure 2A:
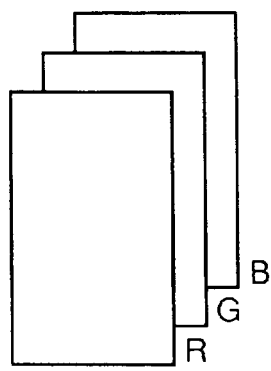
FIG. 2A is a diagram for describing an example of image data entered into a computer shown in FIG. 1.
Figure 2B:
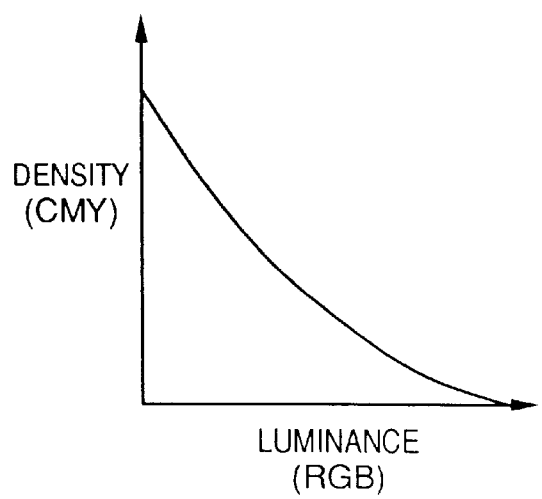
FIG. 2B is a diagram for describing an example of a luminance-density conversion performed by the computer shown in FIG. 1.

First, at step S11 in FIG. 6, the computer 13 controls the image scanner 12 and accepts an input of image data from the scanner. As shown in FIG. 2A, the image data is composed of R, G, B color planes, namely planes of the primary colors. In a high-resolution image, one pixel is expressed by a total of 24 bits, namely eight bits for each of the colors R, G, B.

Next, the computer 13 applies a luminance—density conversion (see FIG. 2B) at step 12 to convert the RGB image data from luminance data to density data CMY. This conversion ordinarily entails execution of processing in which various coefficients are applied with a logarithmic conversion serving as the base. The details do not have a direct bearing upon the invention and therefore need not be described.

Figure 2C:
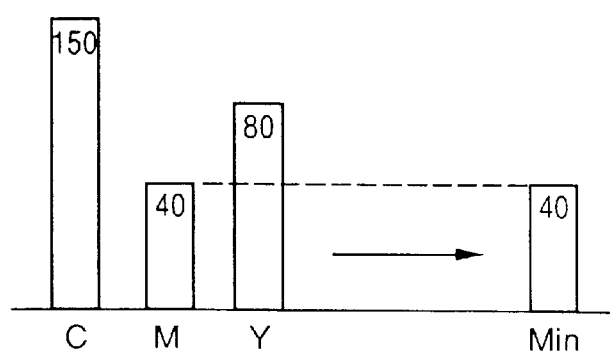
FIG. 2C is a diagram for describing an example of minimum-value extraction performed by the computer shown in FIG. 1.

Next, the minimum value among the items of CMY data is extracted as a minimum value Min at step S13. In the example of FIG. 2C, M is the smallest value and therefore the minimum value Min is 40.

Figure 3A:
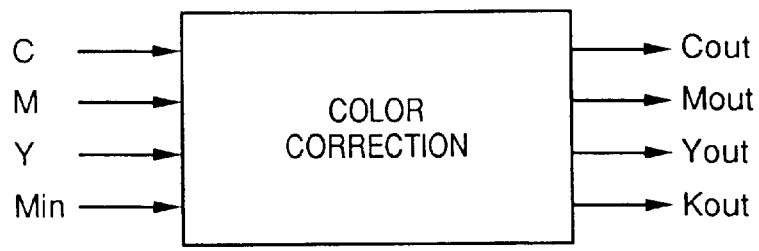
FIGS. 3A, 3B and 3C are diagrams for describing examples of color correction performed by the computer shown in FIG. 1.
Figure 3B:
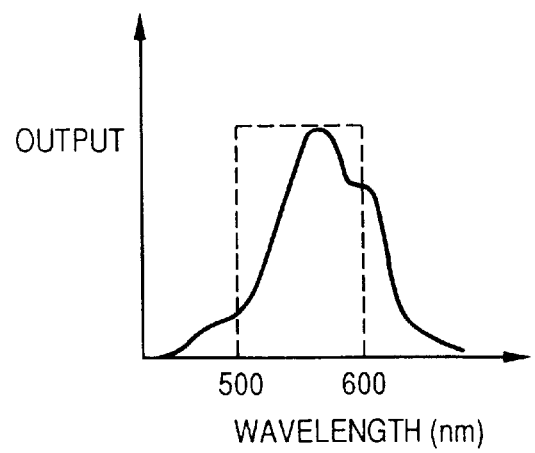
Figure 3C:
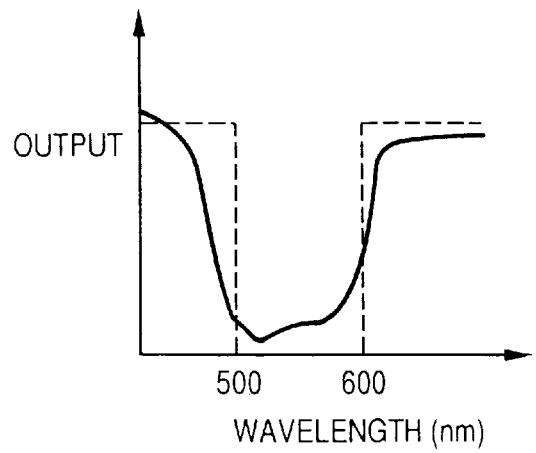

Next, at step S14, a color correction and generation of black data K shown in FIG. 3A are carried out. Green G is converted to magenta M by the luminance—density conversion. Ideally, the wavelength characteristic of green G indicates a rectangular reflection characteristic over wavelengths of from 500 to 600 nm, as illustrated by the dashed line in FIG. 3B. However, the color-filter characteristic of the image scanner 12 departs from the ideal characteristic, as indicated by the solid line in FIG. 3B. Further, the wavelength characteristic of magenta M ideally indicates a rectangular absorption characteristic over wavelengths of from 500 to 600 nm, as illustrated by the dashed line in FIG. 3C. However, the characteristic of the ink departs from the ideal characteristic, as indicated by the solid line in FIG. 3C.

The color correction is for the purpose of making the deviations in these characteristics approach the ideal characteristics. Ordinarily, a matrix operation referred to as "masking", described below, is executed to apply a correction to image data, which conforms to the characteristic of the ink actually used, and to generate the black data K. The following expresses the matrix operation:

$$\begin{bmatrix} Cout \\ Mout \\ Yout \\ Kout \end{bmatrix} = \begin{bmatrix} A11 & A12 & A13 & A14 & A15 & A16 & A17 & A18 \\ A21 & A22 & A23 & A24 & A25 & A26 & A27 & A28 \\ A31 & A32 & A33 & A34 & A35 & A36 & A37 & A38 \\ A41 & A42 & A43 & A44 & A45 & A46 & A47 & A48 \end{bmatrix} \begin{bmatrix} C \\ M \\ Y \\ C \times M \\ M \times Y \\ Y \times C \\ Min \\ Min^2 \end{bmatrix} \quad (1)$$

where A11~A48 are coefficients.

Next, color compression illustrated in FIG. 4 is executed at step S15.

If four-color ink is used and the data width is eight bits for each color, the amount of data is 36 bits per pixel. As a result, the amount of image data is enormous. A compression algorithm for effecting compression to 256 colors, for example, will now be described.

(1) Since the number 256 is four raised to the fourth power, tones of each color are rounded off (quantized) to four stages. For example, eight-bit data can take on values of 0 to 256. These values are approximately quartered to set four representative values of 0, 85, 170 and 255, as illustrated in FIG. 5A by way of example.

(2) Threshold values for the purpose of rounding off to the four values mentioned above are set. For example, an approximately intermediate value in each stage is set as the threshold value, as exemplified in FIG. 5A.

(3) Input data is rounded off to any of the above-mentioned four values using the error preservation method. If the input data is, say, 118, this is replaced by the representative value 85, as exemplified in FIG. 5A. At this time a difference or error of 33 is produced between the input data and the representative value. The error is diffused to the neighboring pixels. FIG. 5B is a diagram showing an example of weighting for diffusing error to the neighboring pixels of a pixel D of interest. If the error is 33, the values indicated in FIG. 5C are added to the values of the neighboring pixels. This processing is applied to all of the image data.

By virtue of the foregoing processing, the tones of the image data of each color are rounded off to, say, four stages and the density of the overall image is preserved.

Next, at step S16 in FIG. 6, the YMCK data of two bits per color obtained by color compression is converted to code data (hereinafter referred to as "palette data") corresponding to a palette of, say, 256 colors. This palette data is outputted at step S17. The palette data, which is outputted by the computer 13, is fed into the image processor 14. It should be noted that a palette table indicating the correspondence between the image data and palette data is established in advance and supplied to the computer 13 together with its software. Further, in the description given above, the processing shown in FIG. 6 is executed by software in the computer 13 in accordance with the program supplied. However, the processing can also be executed by hardware provided in the main body A or the like.

The processing procedure of the image processor 14 will be described next.

Figures 12A, 12B, 12C:
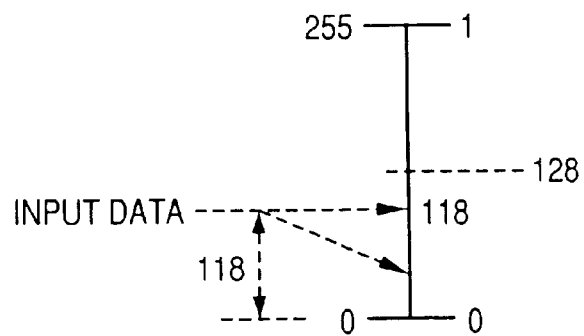
FIGS. 12A, 12B and 12C are diagrams for describing the details of binarization.
Figure 13:
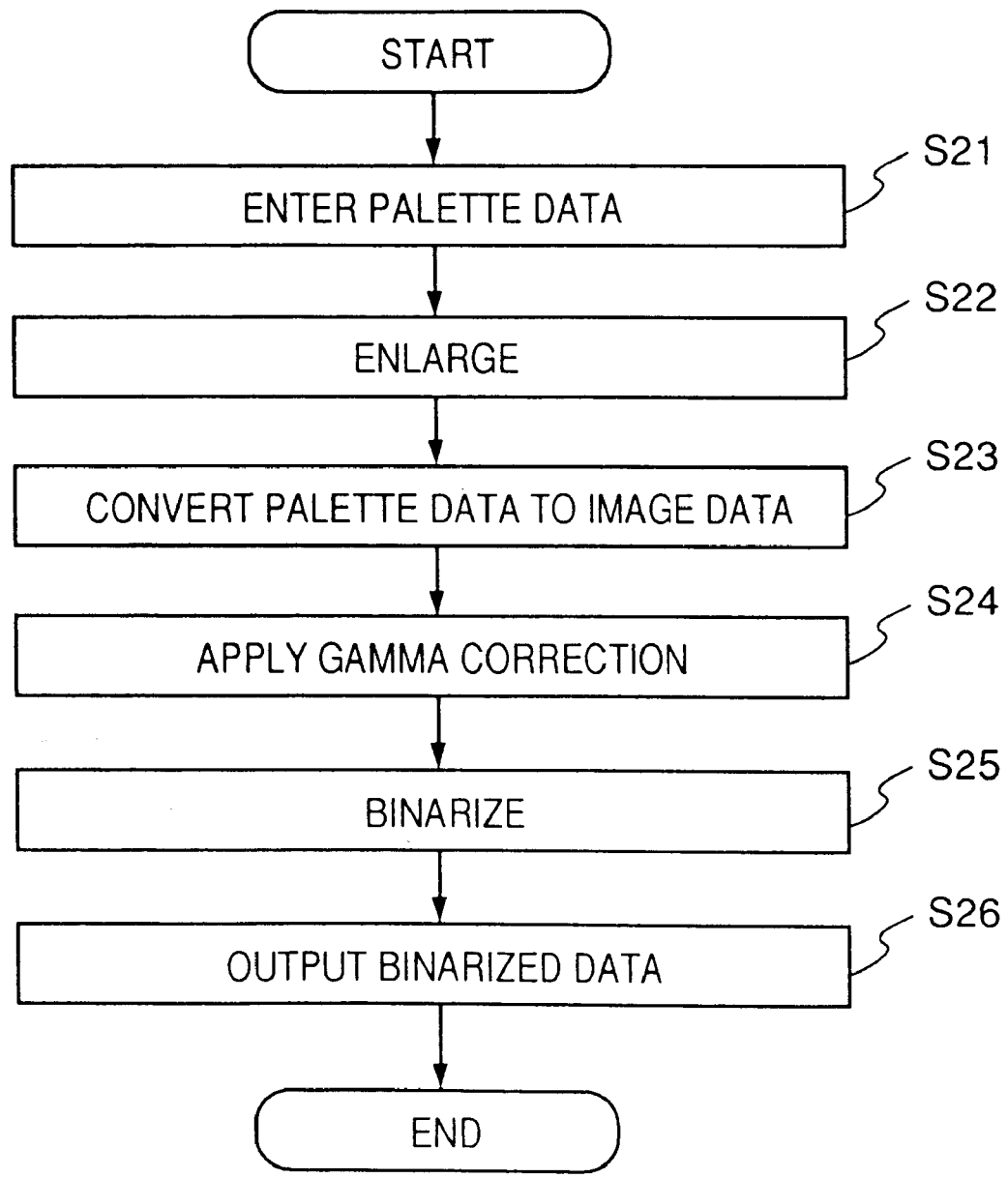
FIG. 13 is a flowchart illustrating an example of a processing procedure executed by the computer shown in FIG. 1.

FIGS. 7 through 12C are diagrams for describing an example of image processing executed by the image processor 14, and FIG. 13 is a flowchart illustrating an example of the processing procedure of the image processor 14. The latter comprises a CPU, a ROM, a RAM and an image memory and executes the processing of FIG. 13 in accordance with a program stored in the ROM, etc. It should be noted that the processing described below can also be implemented by special-purpose hardware.

First, the image processor 14 accepts an input of palette data, an example of which is shown in FIG. 13, at step S21. For example, one pixel of this data is represented by eight bits and therefore is capable of expressing any of 256 colors. The palette data is one-third the data size shown in FIG. 2A.

Next, at step S22, enlargement processing is executed as needed. For example, in case of an enlargement ratio of 200%, the image is enlarged by repeating the pixels A, B, C, D twice in each of the vertical and horizontal directions, as exemplified in FIG. 8.

Figures 8, 9:
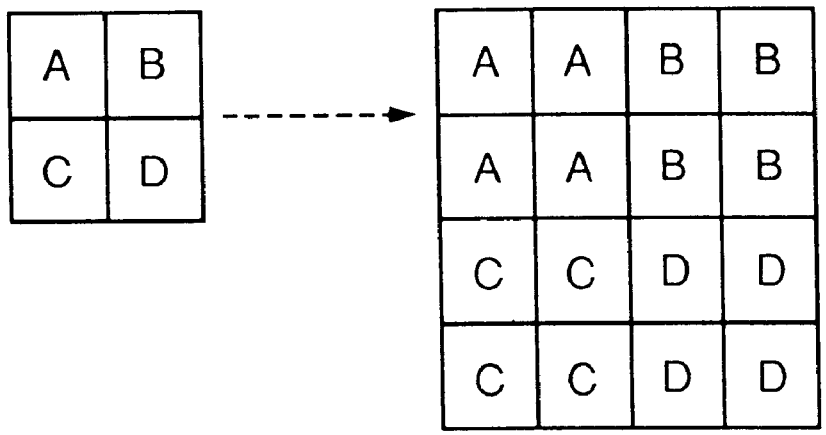
FIG. 8 is a diagram for describing an example of enlargement processing performed by the image processor shown in FIG. 1.
FIG. 9 is a diagram for describing an example of image data conversion performed by the image processor shown in FIG. 1.

Next, at step S23, the palette data is converted to image data corresponding to the color of the ink. FIG. 9 illustrates an example in which palette data 0 is converted to (C,M,Y,K)=(0,0,0,0), namely to no color; palette data 75 to (C,M,Y,K)=(200,100,0,0), or the color blue; palette data 139 to (C,M,Y,K)=(100,100,100,255), or the color black; and palette data 58 to (C,M,Y,K)=(0,150,80,0), or the color pink. Palette data other than the foregoing also is converted to corresponding colors. It should be noted that a palette table indicating the relationship between the palette data and the eight-bit data corresponding to each of the inks of colors C, M, Y, K is established beforehand and stored in the ROM.

Next, at step S24, a gamma correction is applied to the multivalued data of each of the colors C, M, Y, K. As shown for example in FIG. 10A, the correspondence between the image data and printing density loses its linearity and tends to saturate at portions where the density is high. Accordingly, a linear relationship between image data and printing density of the kind shown in FIG. 10B is obtained by correcting the image data.

Binarization processing shown in FIG. 11 is executed at step S25. The binarization algorithm is as follows:

(1) Since an ink-jet printing method is a binary printing method, density attains a maximum value when ink is jetted and a minimum value when ink is not jetted. Accordingly, intermediate density is set as a binarization threshold value.

(2) The input data is binarized using the error preservation method. For example, assume the case of eight bit data. If the input data is 118, then this data is replaced by 0 since the value thereof is less than the intermediate value of 128, as exemplified in FIGS. 12A, 12B and 12C. At this time a difference or error of 118 is produced between the input data and the substitution value but the error is diffused to the neighboring pixels. FIG. 12B is a diagram showing an example of weighting for diffusing error to the neighboring pixels of a pixel D of interest. If the error is 118, the values indicated in FIG. 12C are added to the values of the neighboring pixels. This processing is applied to the entirety of the image data.

By virtue of the foregoing processing, the image data of each color is binarized and the density of the overall image is preserved.

What is noteworthy here is that the error diffusion matrix exemplified in FIG. 5B and the error diffusion matrix exemplified in FIG. 12B are different. As a result, interference such as moiré caused by executing error diffusion in two stages is suppressed.

The binarized image data is outputted at step S26 in FIG. 13. This binarized data, which is outputted by the image processor 14, is supplied to the printing section 3 or 8 via an image memory, by way of example. It should be noted that the reading/writing of the image memory is controlled by a controller. The controller reads images out of the image memory repetitively in a prescribed order and supplies the images to the printing section 3 or 8, whereby basic images are printed repeatedly.

Further, the processing illustrated in FIG. 13 can also be executed on the side of computer 13 by supplying the software to the computer 13 using a magnetic recording medium or the like.

Next, the problem of "sweeping" encountered in color compression using the density preservation method, as well as measuring for dealing with this phenomenon, will be described.

Image data is divided into, say, four values and the error produced at such time is preserved, as set forth earlier. At the beginning of processing, therefore, a consistent density is not obtained and a decline in density readily occurs. Consequently, in an arrangement in which the impression of a continuous image is produced by repeatedly printing a basic image, as in the manner of textile printing, there is a decline in density at the boundaries of the basic images (especially at the upper corners of the images in a case where raster processing is executed horizontally starting from the upper left). This causes the boundaries or borders to become conspicuous.

Figure 14A:
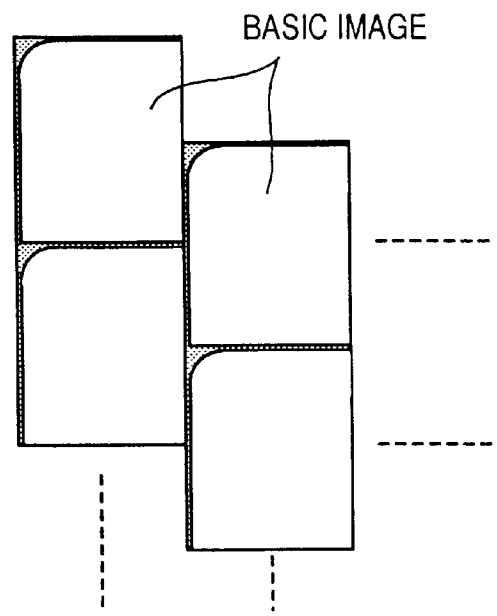
FIG. 14A is a diagram illustrating an example of the occurrence of "sweeping"

FIG. 14A is a diagram showing an example of the occurrence of "sweeping". The shaded portion appears as a white streak caused by "sweeping" and occurs at the upper and left sides of each basic image, namely at the portions where the image begins. This is a result of the fact that in quantization of the error preservation type, such as error diffusion, there is little cumulative error immediately after the start of processing.

Figure 14B:
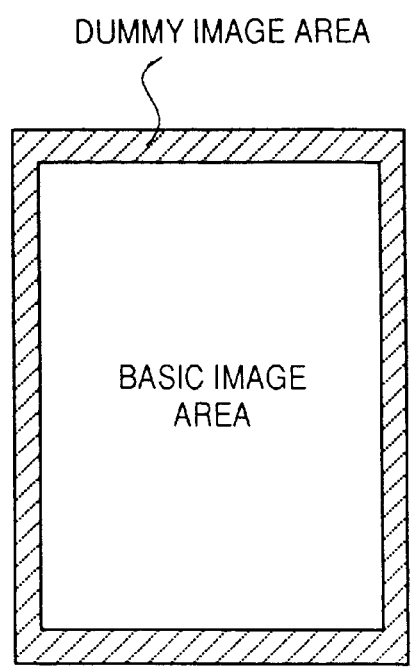
FIG. 14B is a diagram showing an example of means for dealing with "sweeping" according to this embodiment.

FIG. 14B is a diagram showing an example of a measure for dealing with "sweeping". Here a dummy image is added onto the periphery of the basic image, the image is then subjected to color compression and the dummy image is removed after color compression to leave only the basic image. This makes it possible to eliminate "sweeping" which has occurred in the areas of the dummy image.

Figure 15A:
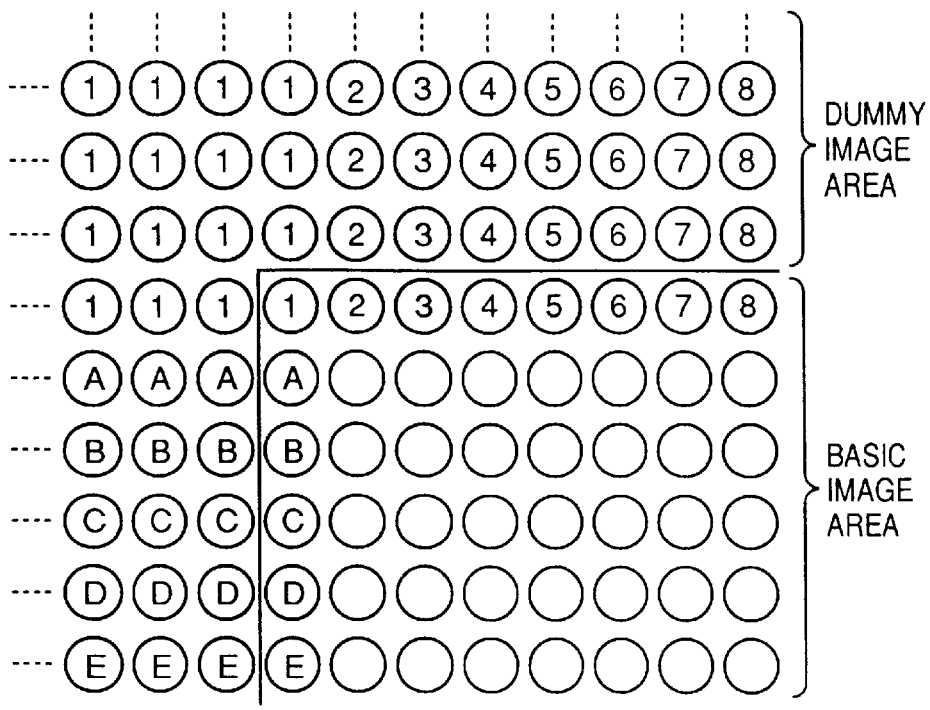
FIGS. 15A and 15B are diagrams illustrating methods of adding on a dummy image according to this embodiment.
Figure 15B:
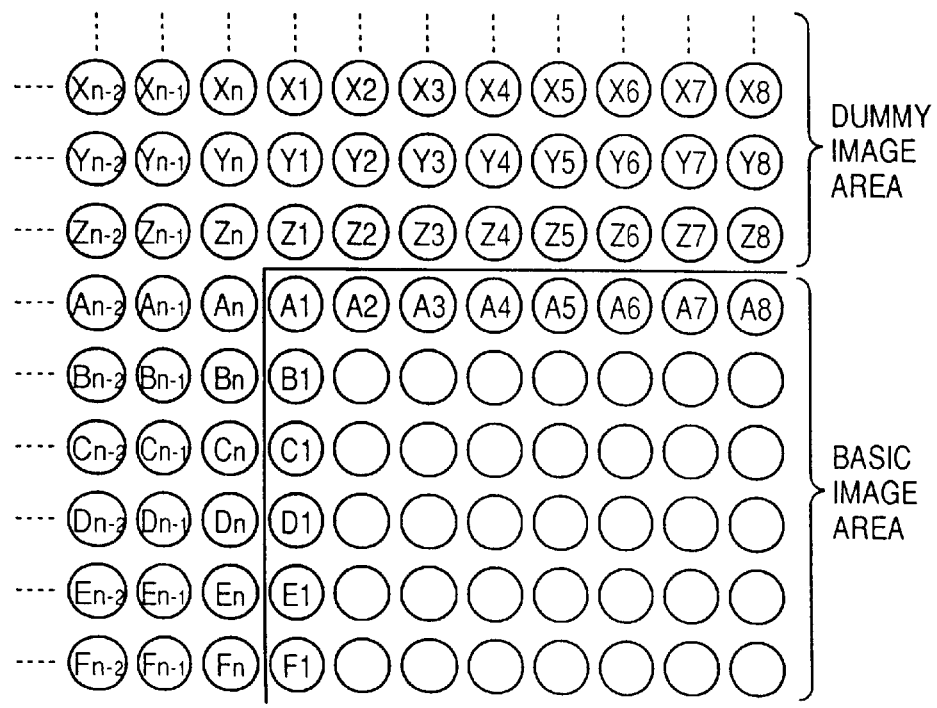

FIGS. 15A and 15B are diagrams showing methods of adding on the dummy image. According to the method shown in FIG. 15A, data representing the peripheral pixels of the basic image is repeated as the dummy image. This processing is easy to execute. Accordingly, in a case where processing is implemented by software, only a short period of time suffices. If processing is implemented by hardware, the additional components necessary are minimal. It should be noted that the width of the dummy image added on usually is on the order of tens of pixels.

According to the method shown in FIG. 15B, data representing a repeated image area is added onto the periphery of the basic image. Though the ease of processing is inferior to that of the method shown in (a) above, the occurrence of white streaks at the repeated portions is suppressed, thereby making it possible to obtain a high-quality image.

It should be noted that the methods of adding on the dummy image are not limited to the two methods described above.

FIGS. 16A, 16B, 16C and 16D are diagrams showing examples of problems which arise when enlargement processing is executed after color compression.

FIG. 16A illustrates a uniform density image of low density (where a density of 10 is illustrated as an example). When this image is directly enlarged 200% and binarized, the result is in FIG. 16B. Since the ratio at which density is converted in this case is 10/255, "1" (jetting of ink) is generated at a rate of once per about 25 pixels. When the image in FIG. 16A is subjected to the color compression shown in FIG. 5A, the result is in FIG. 16C. Since the ratio at which density is converted in this case is 10/85, data of density 85 is generated at a rate of once every eight or nine pixels. When this image is enlarged and binarized, an image of the kind exemplified in FIG. 16D is obtained. Here concentration of density is pronounced and results in conspicuous "graininess".

The best method of solving this problem of conspicuous graininess is to change the representative value 85 in FIG. 5A to a low-density value of 10 or 20, by way of example. By doing so, the four representative values become, say, 0, 25, 170 and 255, thereby reducing the concentration of density so that a binary image of the kind shown in FIG. 16B, for example, can be obtained.

The color compression compressing of step S15 in FIG. 6 can be moved between step S13 (extraction of minimum value) and step S14 (color correction and black-data generation). If this is done, a satisfactory color correction in terms of the color of the ink cannot be applied, meaning that perfect preservation of density cannot be achieved. This is because C×M, M×Y and Y×C and, in a case where K is the minimum value, a term of second degree, namely the square of K, are present in Equation (1). Though this is a disadvantage, the following advantage is obtained:

(1) In a situation where the colors of ink are increased, as in a case where a blue- or orange-colored ink is provided in addition to the ink colors C, M, Y, K, the four-stage palettization becomes palettization of three stages or less and a problem such as graininess in enlargement processing reappears. However, if color compression is executed before color correction, four-stage palettization is achieved even if the colors of ink are increased, thereby preventing reoccurrence of problems such as graininess.

(2) The processing which follows color correction and black-data generation (step S14) is facilitated.

Thus, in accordance with this embodiment, as described above, a high-quality image can be obtained even in a so-called palette image, in which an RGB full-color image has been subjected to color compression, in a printing method and apparatus capable of binary tone expression only, as in the ink-jet printing method. For example, in a case where basic images are printed repeatedly, as in images printed on textiles, it is possible to obtain a high-quality image devoid of problems such as the occurrence of white streaks caused by "sweeping" at the boundaries of the basic images.

Further, in accordance with this embodiment, before the image data of eight bits per YMCK is binarized, color compression is performed, pelletization is carried out and a conversion is made to prescribed values. As a consequence, a certain amount of noise is produced owing to quantization error. When this palette image is binarized, problems such as the white streaks resulting from "sweeping" are mitigated by the effects of quantization error in comparison with the case in which the data of eight bits per YMCK is binarized directly. This makes it possible to obtain a high-quality image.

More specifically, by converting color image data to data of a prescribed number of colors while preserving density and then binarizing the results of conversion, the amount of image data can be reduced without causing a decline in picture quality. This makes it possible to prevent a decline in processing speed as well as higher memory cost.

Further, by adding dummy image data generated from color image data onto the periphery of the color image data, compressing the number of colors and then removing pixels corresponding to the dummy image data from the results of compression, the so-called "sweeping" phenomenon, which is a disadvantage of the error diffusion method, is prevented. This makes it possible to solve the problem of loss of image continuity caused by lightening of the image at the borders of the basic images.

Further, a plurality of quantization levels, which are for quantizing the color components of color image data, are assigned approximately equally with respect to the range of color components. In addition, the minimum quantization level, exclusive of zero, is set to a level lower than those assigned approximately equally. As a result, it is possible to reduce concentration of density caused by enlargement processing executed after color compression.

Further, by preserving density by using one error diffusion matrix for compression of the number of colors and a different error diffusion matrix for binarization, a deterioration in picture quality caused by interference such as moiré can be prevented.

Second Embodiment

In the embodiment described above, compression to palette data is performed after the RGB image data is converted to CMYK image data. In this embodiment, however, first the RGB image data is compressed to palette data and then data constituting a palette table is converted from that for accommodating RGB to that for accommodating CMYK, which are the colors in which printing is carried out.

Figure 18:
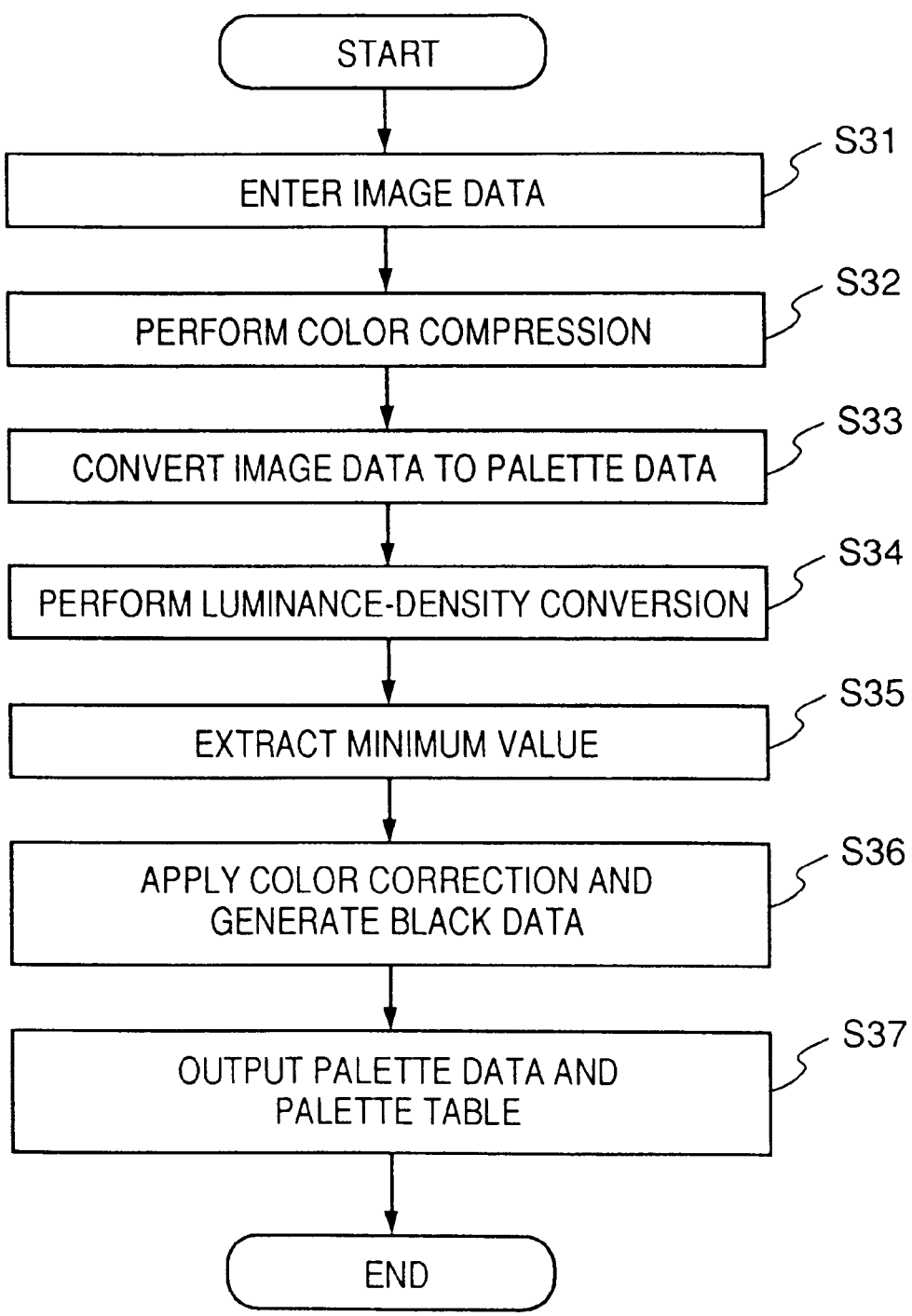
FIG. 18 is a diagram for describing a second embodiment of the present invention.

More specifically, as shown in FIG. 18, RGB image data of eight bits per color is entered at step S31. Then, at step S32, the data is color-compressed to image data of six tones per R, G, B (for a total of 214 tones), while density is preserved, through a method similar to that of the first embodiment. Next, at step S33, the color-compressed image data is converted to code data (palette image data) corresponding to a palette of 214 colors.

Step S33 is followed by steps S34, S35 and S36, at which the palette table indicating the relationship between the above-mentioned RGB image data and palette data is converted to a palette table for the recording colors. This procedure can be carried out in a manner similar to the procedure of steps S12~S14 of the first embodiment.

The palette data thus generated is transmitted to the main body A at step S37. At this time the palette table indicating the relationship between the palette data and the recording colors CMYK also is downloaded from the computer 13 to the main body A, where the table is stored in the RAM of the image processor 14.

Processing executed in the main body A is similar to that of the first embodiment with the exception of use of the downloaded palette table.

The palette-table conversion indicated at steps S34~S36 above may be performed by the image processor 14 rather than on the side of the computer 13.

In accordance with the second embodiment as set forth above, the data constituting the palette table need only be subjected to processing such as a color correction and black-data generation. This is advantageous in that the quantity of operations involved can be reduced by a wide margin.

Further, since palettization is carried out in the form of RGB image data, an advantage obtained is that tone reproducibility is improved.

Further, since palettization is carried out in the form of RGB image data, an advantage obtained is that tone reproducibility is improved.

More specifically, (1) the number of quantizations in each of the R, G, B groups is enlarged (in comparison with the case of the four colors Y, M, C, K). (2) Since a combination of actually existing colors is used, the allocation of colors in the palette can be employed effectively. (in a case where an expansion is performed in the colors Y, M, C, K, a combination of colors which is actually impossible can be excluded from the palette, as in the manner of C=255, M=255, Y=255, K=255).

Further, in a case where ink colors are palettized, as in the first embodiment, the number of quantizations in the ink colors is reduced if an ink color is added on, and grayscale expression is adversely affected. By contrast, in a case where palettization is carried out in each of the input colors R, G, B, as in this embodiment, the number of quantizations does not change even if the ink colors are increased. This is advantageous in that grayscale expression is not affected.

Examples of Ink

Inks ideal for use in a textile printing system of the kind mentioned in the first and second embodiments will now be described.

A typical example of textile printing in the conventional system mentioned above is screen textile printing, in which printing is performed directly on a fabric or the like using a silk screen plate. According to screen textile printing, a silk screen plate is created for an original image to be printed. A silk screen is formed for each color used in the original image. The fabric is then dyed directly with ink through the meshes of the silk.

In this method of screen textile printing, however, a great amount of time and labor are necessary to create the screen plates. Additional tasks needing to be performed are mixing of the inks required for printing and positioning of the screen plates. Furthermore, the apparatus is large in size, especially in proportion to the number of colors used, and a great amount of space is required for installation. Space is also needed for storing the screen plates.

An ink-jet recording apparatus has been put into practical use as a recording apparatus having the functions of a printer, copier or facsimile machine, or a recording apparatus used as the output unit of a compound electronic device or work station including a computer, word processor or the like. A system in which such an ink-jet recording apparatus is utilized in textile printing to perform printing by jetting ink directly onto a fabric, namely a system of the kind described in the first and second embodiments, would be effective as a textile printing system. In accordance with such a system, the plates used in screen textile printing are unnecessary so that it is possible to curtail the process up to printing on the fabric and to shorten the required time correspondingly. It is also possible to make the apparatus smaller in size. It goes without saying that the image information for printing can also be saved on a medium such as tape, floppy disk or optical disk. This greatly facilitates storage and preservation. It is also possible to readily carry out such operations as changing the color scheme of the original image, altering the layout and performing manipulations such as enlargement and reduction.

Ink-jet recording means (a recording head) utilizing thermal energy to jet ink can readily be manufactured to have a highly dense arrangement of ink passages (jetting ports) by forming electrothermal transducers, electrodes, ink passage walls and plates, manufactured in the form of films on a substrate, through a semiconductor manufacturing process such as etching, vapor deposition or sputtering, etc. This makes it possible to achieve greater miniaturization, higher recording speed, picture quality of higher definition, etc. A recording head of this type is well suited for use in ink-jet textile printing.

When such a recording head is applied to the above-described textile printing apparatus, especially when a fabric is subjected to ink-jet textile printing, the fabric is required to have the following capabilities:

(1) the ink should color the fabric to a satisfactory density;

(2) the ink dyeing rate should be high;

(3) the ink on the fabric should dry quickly;

(4) there should be little irregular blurring of the ink on the fabric; and (5) the fabric should be easy to convey through the interior of the apparatus.

In order to satisfy these requirements, the present invention is such that the fabric can be subjected to pre-treatment as necessary. For example, a type of fabric having an ink accepting layer has been disclosed in the specification of Japanese Patent Application Laid-Open (KOKAI) No. 62-53492, and a fabric containing a reduction inhibiting agent or an alkaline substance has been proposed in the specification of Japanese Patent Publication (KOKOKU) No. 3-46589. An example of pre-treatment is to make the fabric contain a substance selected from among an alkaline substance, an aqueous macromolecule, a synthetic macromolecule, an aqueous metal salt, urea and thiourea.

Examples of the alkaline substance include alkali metal hydroxides such as sodium hydroxide and calcium hydroxide; amines such as mono-, di- and triethanolamines; and alkali metal carbonates or bicarbonates such as sodium carbonate, calcium carbonate and sodium bicarbonate. Further examples are organic metal salts such as calcium acetate and barium acetate, ammonia and ammonia compounds. It is also possible to use trichlorosodium acetate, which becomes an alkaline substance under steaming or dry heating. Sodium carbonate and sodium bicarbonate, which are used in dyeing employing reactive dyes, are especially preferred as the alkaline substance.

Examples of the aqueous macromolecule include starches such as corn and wheat; cellulose substances such as carboxymethylcellulose, methylcellulose and hydroxyethylcellulose; polysaccharides such as sodium alginate, gum arabic, locust bean gum, gum tragacanth, guar gum and tamarind seed; protein substances such as gelatin and casein; and natural aqueous macromolecules such as tannin substances and lignin substances.

Examples of the synthetic macromolecules that can be mentioned include polyvinyl alcohol compounds, polyethylene oxide compounds, acrylic aqueous macromolecules and maleic anhydride aqueous macromolecules. Among these, polysaccharide macromolecules and cellulose macromolecules are preferred.

As for the aqueous metal salt, mention can be made of compounds of pH 4~10 which form typical ion crystals, as in the manner of a halogen compound of an alkali metal or alkali earth metal. Typical examples of such compounds are $NaCl$, $Na_2SO_4$, $KCl$ and $CH_3COONa$ in the case of an alkali metal and $CaCl_2$ and $MgCl_2$ in the case of an alkali earth metal. Among these, salts of Na, K and Ca are especially preferred.

Methods of making the fabric contain the above-mentioned substances in the pre-treatment are not particularly limited but mention can be made of the ordinary methods of dipping, vatting, coating and spraying.

Furthermore, the textile printing ink applied to the fabric for ink-jet textile printing merely attaches itself to the fabric in the state in which it is applied. Accordingly, it is desired that a fixing step be carried out following application of the ink in order to fix the ink coloring matter such as the dye to the fibers of the fabric. The fixing step may be one well known. Examples include a steaming method, an HT steaming method and a thermofixing method. In a situation in which the fabric used is not one previously subjected to an alkaline treatment, the mixing methods that can be used include an alkali-pad steam method, an alkali-broach steam method, an alkali shock method and an alkali cold fixing method. Depending upon the dye, the fixing process may or may not include a reaction step. An example of the latter is to impregnate the fibers with the coloring matter so that the coloring matter will not physically separate subsequently. Any ink may be used so long as it has the required coloring matter. The ink is not limited to dye but may be a pigment if desired.

Removal of unreacted dye and elimination of substances used in pre-treatment can be carried out by washing, in line with the well-known method, after the reactive fixing step described above. It is preferred that the conventional fixing treatment be carried out at the same time as washing.

A printed article that has undergone the above-described post-treatment is cut to the desired size, and the cut pieces are sewed, bonded or fused together to obtain the finished product. Examples of the finished products are garments such as dresses, neckties and bathing suits, mattress covers, sofa covers, handkerchiefs and curtains. Methods of obtaining garments and daily necessities as by sewing the fabric may be those well known in the art.

Examples of the printing media include threads used in fabric, wall fabric and embroidery, sheet-like material such as wallpaper, paper, OHP film and anodized aluminum and various other media to which a prescribed liquid can be applied using ink jetting technology. The fabric can be any textile, unwoven fabric or cloth irrespective of how it is woven or knitted.

The present invention can be applied to a system constituted by a plurality of devices such as a scanner computer and printer or to an apparatus comprising a single piece of equipment in which these devices are integrated. Furthermore, it goes without saying that the invention is applicable also to a case where the object of the invention is attained by supplying a program, which has been stored on a floppy disk or the like, to a system or apparatus.

Further, the present invention is not limited to an ink-jet printer but can also be applied to electrophotographic printers such as a laser-beam printer, an LED printer or a thermal-transfer printer.

In the example described above, gamma-correction processing is executed after the palette data is converted to CMYK multivalued image data at step S23 in FIG. 13. However, the invention is not limited to gamma-correction processing. For example, the multivalued image data may be subjected to other processing such as so-called "head shading" to correct for nozzle unevenness in the ink-jet head.

Further, binarization is performed again at step S25 in FIG. 13 in the example described above. However, the invention is not limited to binarization. Quantization such as a three- or four-value conversion may be performed in conformity with the grayscale reproducibility of the printer.

Further, the palette table may be stored beforehand in memory means within the host computer 13 and image processor 14 and may be created within each of these devices.

Further, in a case where the palette table is downloaded from the host computer 13 to the image processor 14, the palette table may be transmitted before or after the palette data. In a case where the palette table is transmitted after the palette data, the palette data will already have been transmitted. This makes it possible to execute processing in one batch when other image processing such as a gamma correction is carried out.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

converting means for converting given N-color image data to M-color image data where N>M>2, while preserving density of the N-color image data; and quantizing means for quantizing the M-color image data to color image data having the number of tone levels which can be represented by image forming means, while preserving density of the M-color image data, wherein said converting means and quantizing means use error diffusion matrices which are different from each other.

2. The apparatus of claim 1, further comprises reading means for reading an original and generating the N-color image data on the basis of the original, wherein said image forming means forms an image represented by image data which is quantized by said quantizing means.

3. The apparatus according to claim 2, wherein an image read by said reading means is formed repeatedly by said image forming means on the basis of a prescribed rule.

4. The apparatus according to claim 1, wherein a number of colors representable by the N-color image data inputted to said converting means is greater than a number of colors representable by the M-color image data outputted by said converting means.

5. An image processing apparatus comprising:

converting means for converting given N-color image data to M-color image data where M<N, while preserving density of the color image data; and binarization means for subjecting the M-color image data obtained by said converting means to density-preserving binarization processing which preserves density of the M-color image data by using error diffusion, and wherein said converting means and said binarization means preserve density by different error diffusion matrices.

6. An image processing apparatus comprising:

converting means for converting given color image data to data of a prescribed number of colors while preserving density of the color image data; and binarization means for subjecting results of conversion by said converting means to density-preserving binarization processing, wherein said converting means compresses the number of colors after adding dummy image data, which is generated from the color image data, onto the periphery of the color image data, and eliminates pixels corresponding to the dummy image data from results of compression.

7. An image processing apparatus comprising:

converting means for converting given N-color image data to M-color image data where M<N, while preserving density of the color image data; and binarization means for subjecting results of conversion by said converting means to density-preserving binarization processing, wherein said converting means possesses a plurality of quantization levels for quantizing color components of the color image data, assigns the plurality of quantization levels approximately equal to ranges of the color components, and sets a minimum quantization level, exclusive of zero, to a level lower than those assigned approximately equal.

8. An image processing method comprising the steps of:

converting given N-color image data to M-color image data where N>M>2, while preserving density of the N-color image data; and quantizing the M-color image data to color image data having the number of tone levels which can be represented by image forming means, while preserving density of the M-color image data, wherein the converting and quantizing steps use error diffusion matrices which are different from each other.

9. The method according to claim 8, wherein a number of colors representable by the N-color image data converted in said converting step is greater than a number of colors representable by the M-color image data obtained in said converting step.

10. An image processing method comprising the steps of:

converting given color image data to data of a prescribed number of colors while preserving density of the color image data; and subjecting results of conversion at said converting step to density-preserving binarization processing, wherein said converting step includes compressing the number of colors after adding dummy image data, which is generated from the color image data, onto the periphery of the color image data, and eliminating pixels corresponding to the dummy image data from results of compression.

11. An image processing method comprising the steps of:

converting given N-color image data to M-color image data where M<N, while preserving density of the color image data; and subjecting results of conversion at said converting step to density-preserving binarization processing, wherein said converting step possesses a plurality of quantization levels for quantizing color components of the color image data and includes assigning the plurality of quantization levels approximately equal to ranges of the color components, and setting a minimum quantization level, exclusive of zero, to a level lower than those assigned approximately equal.

12. An image processing method comprising the steps of:

converting given N-color image data to M-color image data where M<N, while preserving density of the color image data; and subjecting the M-color image data obtained at said converting step to density-preserving binarization processing which preserves density of the M-color image data by using error diffusion, wherein density is preserved at said converting and binarization steps by different error diffusion matrices.

13. An article recorded by a manufacturing method comprising the steps of:

converting given N-color image data to M-color image data where N>M>2, while preserving density of the N-color image data;

quantizing the M-color image data to color image data having the number of tone levels which can be represented by image forming means, while preserving density of the M-color image data, wherein the converting and quantizing processes use error diffusion matrices which are different from each other; and forming an image represented by image data quantized in said quantizing step on a recording medium using a recording head of the image forming means.

14. An image processing apparatus comprising:

converting means for converting given N-color image data to M-color image data where M<N, while preserving density of the color image data; and binarization means for subjecting results of conversion by said converting means to density-preserving binarization processing, wherein a number of colors representable by the N-color image data inputted to said converting means is greater than a number of colors representable by the M-color image data outputted by said converting means, and wherein said converting means compresses the number of colors after adding dummy image data, which is generated from the color image data, onto the periphery of the color image data, and eliminates pixels corresponding to the dummy image data from results of compression.

15. A method of manufacturing an article recorded by ink-jet printing, said method comprising the steps of:

converting given N-color image data to M-color image data where N>M>2, while preserving density of the N-color image data;

quantizing the M-color image data to color image data having the number of tone levels which can be represented by image forming means, while preserving density of the M-color image data, wherein the converting and quantizing steps use error diffusion matrices which are different from each other; and forming an image represented by image data quanitized in said quanitizing step on a recording meduim using a recording head of the image forming means.

16. The method according to claim 15, wherein the recording head produces a change of state in ink by thermal energy applied by thermal energy transducers and jets the ink from jetting ports on the basis of the change of state.

17. The method according to claim 15, wherein the recording medium is fabric.

18. The method according to claim 15, wherein said forming step comprises performing recording by applying ink to the recording medium and then fixing the ink on the recording medium.

19. The method according to claim 18, further comprising a step of applying a washing treatment to the recording medium, on which recording has been performed, after the ink is fixed.

20. The method according to claim 15, further comprising a step of applying a pre-treatment agent to the recording medium before being recorded on by jetting of ink from the recording head.

21. The method according to claim 15, wherein the recording head comprises an ink-jet recording head which jets ink utilizing thermal energy and has thermal energy transducers for generating the thermal energy applied to the ink.

\* \* \* \* \*

UNITED STATES PATENT AND TRADEMARK OFFICE
CERTIFICATE OF CORRECTION

PATENT NO. : 6,031,974

DATED : February 29, 2000

INVENTOR(S) : TAKAHASHI ET AL.

It is certified that error appears in the above-identified patent and that said Letters Patent is hereby corrected as shown below:

[56] References Cited:
 FOREIGN PATENT DOCUMENTS, "3046589" should read --3-46589--.

COLUMN 6:
 Line 27, "FIG. 13," should read --FIG. 7,--.

COLUMN 9:
 Line 3, "pelletization" should read ----palettization--.

COLUMN 12:
 Line 8, "Na$_{2SO4}$," should read --Na$_2$SO$_4$,--.

COLUMN 13:
 Line 41, "comprises" should read --comprising--.

COLUMN 16:
 Line 15, "meduim" should read --medium--.

Signed and Sealed this

Twenty-seventh Day of March, 2001

Attest:

NICHOLAS P. GODICI

*Attesting Officer*    Acting Director of the United States Patent and Trademark Office